J. O. DAVISON.
MACHINE FOR MOLDING CONCRETE BLOCKS.
APPLICATION FILED JUNE 28, 1916.
1,241,932.
Patented Oct. 2, 1917.
2 SHEETS—SHEET 1.
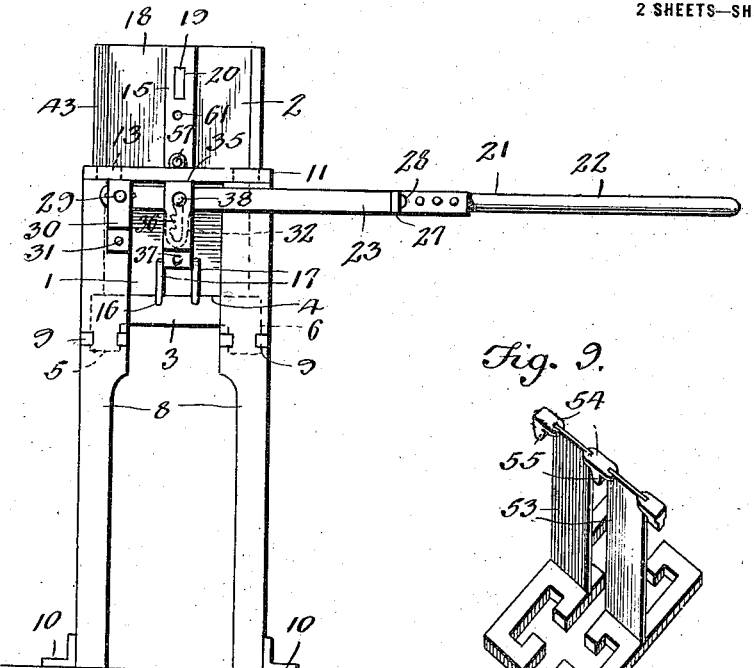
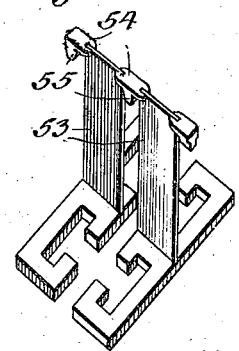
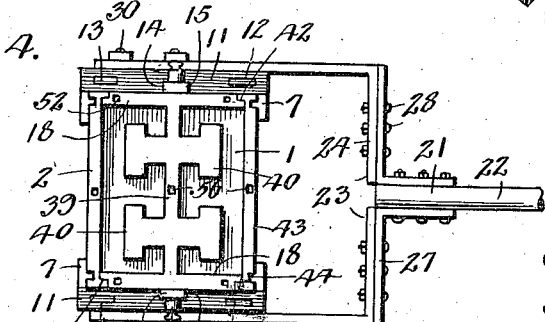
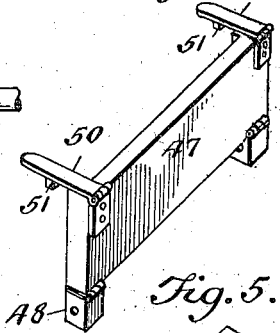
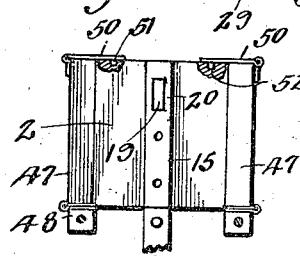
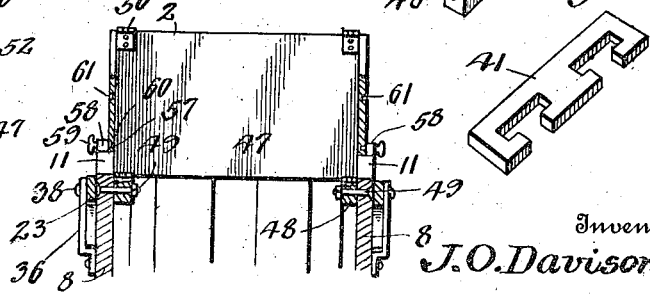
Witnesses
Inventor
J. O. Davison,
By Victor J. Evans
Attorney

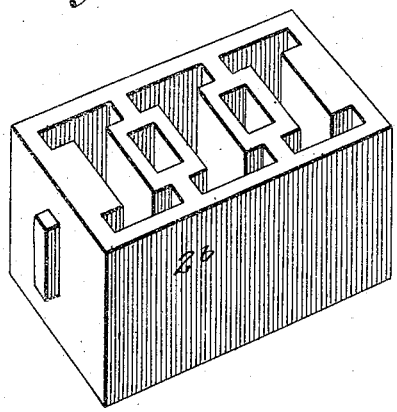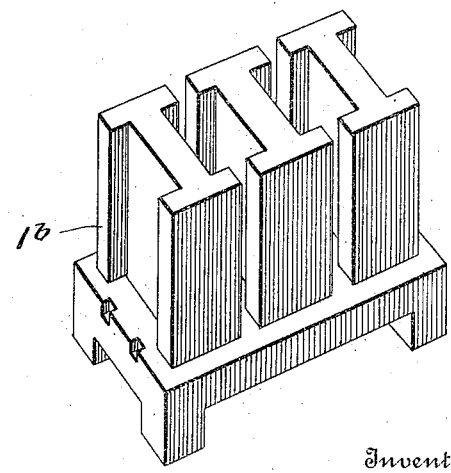

UNITED STATES PATENT OFFICE.

JOHN O. DAVISON, OF OAKLAND, MISSISSIPPI.

MACHINE FOR MOLDING CONCRETE BLOCKS.

1,241,932.

Specification of Letters Patent.

Patented Oct. 2, 1917.

Application filed June 28, 1916. Serial No. 106,440.

*To all whom it may concern:*

Be it known that I, JOHN O. DAVISON, a citizen of the United States, residing at Oakland, in the county of Yalobusha and State of Mississippi, have invented new and useful Improvements in Machines for Molding Concrete Blocks, of which the following is a specification.

This invention is an improved machine for molding concrete blocks and more especially such concrete blocks as are employed in the building construction described and claimed in Letters Patent of the United States #1,141,445. The object of my invention is to provide an improved block molding machine which is simple in construction, strong and durable, is portable, and which is adjustable and adapted for the manufacture of various kinds of blocks.

The invention consists in the features of construction, combination, and arrangement of devices, hereinafter fully described and claimed.

In the accompanying drawings:—

Figure 1 is a side elevation of a concrete block molding machine constructed and arranged in accordance with my invention.

Fig. 2 is a longitudinal, vertical sectional view of the same.

Fig. 3 is a vertical transverse sectional view of the same.

Fig. 4 is a plan of the same.

Fig. 5 is a detail perspective view of a pallet board for use in the mold for molding E-blocks.

Fig. 6 is a detailed elevation, partly in section, of the mold.

Fig. 7 is a detailed vertical longitudinal sectional view of the same.

Fig. 8 is a detailed perspective view of one of the side members of the mold.

Fig. 9 is a detailed perspective view of two of the pallet boards and the partition plates and blocks in operative relation thereto.

Figs. 10 and 11 are detailed perspective views respectively of a form of mold and bed block for use in the machine in molding three I-blocks simultaneously.

In the embodiment of my invention, I provide a bed block 1 which is of a size and shape adapting it to fit in the mold 2 and is provided at the lower side with a base 3 which forms a ledge or flange 4 that extends around the sides and ends of the bed block and is provided at the corners with downwardly extending members 5. These members fit in the vertical openings 6 of socket members 7 which are arranged on the inner sides of supporting legs 8 and are provided with arms 9 which are rabbeted in the supporting legs and bolted thereto as shown. Angle irons 10 are at the lower ends of the supporting legs and are employed for securing them to the floor to hold the molding machine in fixed position.

I also provide a pair of cross bars 11 which are arranged at the ends of the bed block and are provided with mortises 12 which receive tenons 13 that project from the upper ends of the supporting legs. Each bar 12 has a centrally arranged vertical guide groove 14 on its inner side. Vertically arranged guide bars 15 are on the ends of the mold and are arranged to move vertically in the guide grooves 14. The base of the bed block is provided at the ends with spaced notches 16 in which guide lugs 17 are secured, by bolts or the like, said guide lugs engaging opposite sides of the guide bars 15 and coacting with the grooves 14 in accurately guiding and controlling the vertical movements of the mold and its guide bars 15. The end members 18 of the mold are provided on their outer sides with centrally arranged lugs 19 and the guide bars are provided near their upper ends with mortises 20 to receive said lugs so that the mold is firmly and yet detachably connected to the guide bars and for movement therewith.

A lever 21 is employed for moving the mold vertically on the bed block and comprises a handle 22 and a pair of fork arms 23. The fork arms are detachably and adjustably secured to the handle to enable the lever to be used in connection with bed blocks and molds of various lengths, according to the kind of concrete blocks to be molded. To thus secure the fork arms to the handle, each fork arm is provided in its angle portion 24 with a slot 25, which is engaged by a lug 26 on one arm of an angle iron 27, said angle irons being bolted to the handle and being also connected to the angle members of the fork arms by means of bolts 28. Each fork arm is pivotally connected at its inner end as at 29, to the upper end of a rocker link 30, which is pivotally mounted as at 31 on one of the supporting legs 8.

Each fork arm 23 also has a downwardly extending member 32 which is provided with a vertical slot 33 which has ratchet notches 34 in one side. Each guide bar 15 has a shoulder 35 on its outer side at a suitable distance from its lower end to bear under the cross bar 11 when the said guide bar and the mold reach the upper limit of their movement. A bracket 36 is bolted as at 37 on the outer side of the lower portion of each guide bar 15 and forms a vertical slot 37 which is open at its upper end. The members 32 of the fork arms of the lever extend downwardly in the slots 37 and said fork arms are connected to the said bars 15 by pivots 38 which pass through said brackets 36 and slots 37 and said pivots may be engaged by any of the ratchet notches 37, so that the fork arms of the lever may be adjustably, pivotally connected to the guide bars of the mold. This lever thus constructed is very powerful and enables the mold to be readily moved downwardly and upwardly with very slight effort on the part of the operator and moreover the lever connections hereinbefore described confine the angular movements of the lever to a comparatively small number of degrees and the lever is prevented from striking the lugs of the machine on the downward stroke of the lever. In the form of the mold illustrated in Figs. 1, 2, and 3, the mold is adapted for simultaneously molding a pair of substantially E-shaped blocks which are adapted to break joints and to directly interlock as in an interior or partition wall, or to be engaged with and connected in open, spaced relation by I blocks in an outer wall construction. Hence the end members 18 of the mold are connected together by a centrally arranged partition 39 which is provided on opposite sides with T-shaped formers 40. E-shaped pallet boards 41 are provided for use in the mold and are placed in the bottom of the mold and on the upper side of the bed block 1, before the concrete is placed in the mold, the mold being of course raised, so as to extend above the bed block. When the concrete block or blocks have been formed in the mold, the lever is moved downwardly, thus causing the mold to be also lowered and to uncover the sides of the molded block or blocks, together with the pallet board or boards may be removed from the bed block as will be understood. Hence the machine is adapted to manufacture the blocks very rapidly and economically.

The end members 18 of the mold are each provided with rabbets 42 at opposite sides. The side members 43 are reversible and each is provided in one side with grooves 44 to receive the tongues of the rabbets and in the opposite side with tongues 45 to engage in the grooves formed by the rabbets. When the side members are in the first named position, with their grooves 44 engaged by the tongues of the rabbets, the block molds will be narrower than when said members are arranged with their tongues 45 engaged in the grooves of the rabbets, it being understood that the side members of the mold may be arranged with either side outermost. Said side members are secured to the end members by bolts 46. When the side members are thus bolted to the end members of the mold, the mold is necessarily adapted for molding only smooth faced blocks.

In order to adapt the mold for use in molding blocks with an undressed tone face, the side members 43 are discarded, and the members 47 are substituted therefor. The said members 47 have roughened or other suitably formed inner faces, and are provided at their ends with downwardly extending, hinged lugs 48 which are pivotally connected directly to the supporting legs 8 by pivot bolts 49 which are countersunk in said supporting legs to avoid interference in the fork arms of the operating lever. Each hinged or pivoted member 47 is provided at its upper side with hinged latches 50, said latches having studs 51 to engage in locking recesses 52 in the upper sides of the end members of the mold and to secure said side members 47 in closed position on opposite sides of the mold and while the concrete is being tamped into the mold. When the mold is ready to be moved downwardly, after the block is formed, the latches are first released and the members 47 turned downwardly on their pivots, so that the said members 47 of the mold are disengaged from the sides of the molded block. When it is desired to mold half length blocks, I employ thin steel partition plates 53 which are arranged across the center of the molds, have their lower edges engaged in kerfs in the pallet boards and are provided at their upper ends with blocks 54 which have notched edges that extend slightly over the sides and center of the mold and are provided with dowels 55 which engage in dowel openings 56 in the sides and center of the mold. In tamping the concrete, care should be taken to tamp both ends of the mold alike so as to balance the members on opposite sides of the partition plates. When the molds are ready to be pressed down, the blocks 54 are first removed. The partition plates remain in place until the concrete hardens.

To lock the mold in raised position, I provide bolts 57 which are mounted in guide casings 58 on the centers of the cross bars 12. These bolts are provided with operating knobs 59 and may be engaged with and disengaged from openings 60 with which the guide bars 15 are provided. The said guide bars are also provided with half-way openings 61 with which the said bolts may be engaged when it is desired to mold foot width blocks, as will be understood.

In Figs. 10 and 11 respectively, I show a form of mold 2$^b$ and bed block 1$^b$ for use in the machine in molding three I blocks simultaneously. The mold may be modified in form to permit the molding of only two or of a greater number of such blocks as may be desired.

Various modifications may be made in the construction of the mold, bed blocks, and other parts of the device, without departing from the spirit of my invention and within the scope of the appended claims.

Having described the invention, what is claimed is:

1. In a molding machine of the class described, a bed block, a supporting frame for the bed block including elements arranged at the ends of the bed block and provided with vertical guide grooves, a mold movable vertically on the bed block and provided with guides arranged to operate in said guide grooves and a lever having arms mounted on the frame and pivotally and vertically adjustably connected to the guides and arranged to operate and to permit vertical adjustment of the mold.

2. In a molding machine of the class described, a bed block, supporting legs between the upper portions of which the bed block is arranged, said supporting legs having supporting elements for the bed block, cross bars arranged at the ends of the bed block, connecting the upper ends of the legs and having vertical guide grooves, a mold having guides arranged to operate in said grooves and provided with stops to coact with the cross bars in limiting upward movement of the mold, and a lever having arms pivotally connected to two of the supporting legs and also pivotally connected to said guides.

3. In a molding machine of the class described, a bed block, supporting legs between the upper portions of which the bed block is arranged, said supporting legs having supporting elements for the bed block, cross bars arranged at the ends of the bed block, connecting the upper ends of the legs and having vertical guide grooves, a mold having guides arranged to operate in said grooves and provided with stops to coact with the cross bars in limiting upward movement of the mold, and a lever having arms pivotally connected to two of the supporting legs and also pivotally connected to said guides, the pivotal connections between said lever arms and guides permitting vertical adjustment of the mold with reference to said lever arms.

4. A mold machine comprising supporting legs, a bed block arranged between the upper portions of the supporting legs and supported thereby, cross bars arranged at the ends of the bed block, connected to the upper ends of the supporting legs and having vertical guide grooves, a mold having guides arranged to operate in said grooves, rocker links mounted on two of the supporting legs and a lever having arms pivotally connected to the guides and also pivotally connected to the rocker links.

In testimony whereof I affix my signature.

JOHN O. DAVISON.

Copies of this patent may be obtained for five cents each, by addressing the "Commissioner of Patents, Washington, D. C."